(12) United States Patent
Osborn et al.

(10) Patent No.: US 8,812,861 B2
(45) Date of Patent: *Aug. 19, 2014

(54) GRAPHICAL IMAGE AUTHENTICATION AND SECURITY SYSTEM

(75) Inventors: Steven L. Osborn, Sand Springs, OK (US); Nicholas A. Davis, Tulsa, OK (US); James L. Sontag, Portland, OR (US); Joel Norvell, Tulsa, OK (US)

(73) Assignee: Confident Technologies, Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/007,277

(22) Filed: Jan. 14, 2011

(65) Prior Publication Data

US 2012/0023574 A1    Jan. 26, 2012

Related U.S. Application Data

(63) Continuation of application No. 11/420,061, filed on May 24, 2006, now abandoned.

(51) Int. Cl.
*H04L 29/06* (2006.01)
*G06F 21/00* (2013.01)

(52) U.S. Cl.
USPC ........... 713/182; 713/168; 713/170; 713/183; 713/184; 726/2; 726/4; 726/5; 726/6; 726/7; 726/17; 726/18; 726/19; 726/21; 340/5.1; 340/5.2; 340/5.54; 340/5.8; 340/5.81; 340/5.85

(58) Field of Classification Search
USPC .......... 726/1–8, 16–21, 26–30; 713/168–170; 713/182–185; 340/5.1–5.86
See application file for complete search history.

(56) References Cited

U.S. PATENT DOCUMENTS

| 5,276,314 A | 1/1994 | Martino et al. |
| 5,428,349 A | 6/1995 | Baker |

(Continued)

FOREIGN PATENT DOCUMENTS

| JP | 11345206 A | 12/1999 |
| JP | 2001092785 A | 4/2001 |

(Continued)

OTHER PUBLICATIONS

An Association-Based Graphical Password Design Resistant to Shoulder-Surfing Attack by Li et al; Publisher: IEEE; Year: 2005.*

(Continued)

*Primary Examiner* — Madhuri Herzog
(74) *Attorney, Agent, or Firm* — San Diego IP Law Group, LLP

(57) ABSTRACT

A method and system for protection of and secure access to a computer system or computer network. The method includes the steps of receiving a first login account identifier, such as a user name from a user in communication with the computer system or network. A determination is made if the user is recognized and enrolled from the first login account from the first login account identifier. If the user is recognized, a grid of randomly generated visual images is displayed including one visual image from an image category which has been preselected by the user upon enrollment. An image category identifier is randomly assigned to each visual image in the grid. An image category identifier, second login account identifier, such as a password, is entered and received. If the login account identifier and the image category is validated, access is permitted to the computer system or network.

23 Claims, 5 Drawing Sheets

(56) References Cited

U.S. PATENT DOCUMENTS

| | | |
|---|---|---|
| 5,465,084 A | 11/1995 | Cottrell |
| 5,559,961 A | 9/1996 | Blonder |
| 5,608,387 A | 3/1997 | Davies |
| 5,664,099 A | 9/1997 | Ozzie et al. |
| 5,821,933 A | 10/1998 | Keller et al. |
| 5,928,364 A | 7/1999 | Yamamoto |
| 5,948,061 A | 9/1999 | Merriman et al. |
| 6,102,406 A | 8/2000 | Miles et al. |
| 6,209,104 B1 | 3/2001 | Jalili |
| 6,351,634 B1 | 2/2002 | Shin |
| 6,686,931 B1 | 2/2004 | Bodnar |
| 6,718,471 B1 | 4/2004 | Kashima |
| 6,720,860 B1 | 4/2004 | Narayanaswami |
| 6,792,466 B1 | 9/2004 | Saulpaugh et al. |
| 6,823,075 B2 | 11/2004 | Perry |
| 6,862,594 B1 | 3/2005 | Saulpaugh et al. |
| 6,895,387 B1 | 5/2005 | Roberts et al. |
| 6,950,949 B1 | 9/2005 | Gilchrist |
| 6,980,081 B2 | 12/2005 | Anderson |
| 6,981,016 B1 | 12/2005 | Ryan |
| 7,021,534 B1 | 4/2006 | Kiliccote |
| 7,028,192 B2 | 4/2006 | Butler |
| 7,093,282 B2 | 8/2006 | Hillhouse |
| 7,130,831 B2 | 10/2006 | Howard et al. |
| 7,219,368 B2 | 5/2007 | Juels et al. |
| 7,225,157 B2 | 5/2007 | Howard et al. |
| 7,240,367 B2 | 7/2007 | Park |
| 7,451,323 B2 | 11/2008 | Abe et al. |
| 7,536,556 B2 | 5/2009 | Fedorova et al. |
| 7,552,330 B2 | 6/2009 | Kokumai |
| 7,574,739 B2 | 8/2009 | Shirakawa |
| 7,577,994 B1 | 8/2009 | Sobel et al. |
| 7,680,815 B2 | 3/2010 | Komine et al. |
| 7,884,825 B2 | 2/2011 | Nakahashi et al. |
| 2001/0007097 A1 | 7/2001 | Kim |
| 2001/0013039 A1 | 8/2001 | Choi |
| 2001/0037314 A1 | 11/2001 | Ishikawa |
| 2001/0037468 A1 | 11/2001 | Gaddis |
| 2002/0019768 A1 | 2/2002 | Fredrickson et al. |
| 2002/0083347 A1 | 6/2002 | Taguchi |
| 2002/0094868 A1 | 7/2002 | Tuck et al. |
| 2002/0188872 A1 | 12/2002 | Willeby |
| 2003/0046551 A1 | 3/2003 | Brennan |
| 2003/0084275 A1 | 5/2003 | David et al. |
| 2003/0093699 A1 | 5/2003 | Banning et al. |
| 2003/0177248 A1 | 9/2003 | Brown et al. |
| 2003/0177366 A1* | 9/2003 | de Jong .......................... 713/184 |
| 2003/0191947 A1 | 10/2003 | Stubblefield et al. |
| 2003/0210127 A1 | 11/2003 | Anderson |
| 2003/0215110 A1 | 11/2003 | Rhoads et al. |
| 2004/0010721 A1 | 1/2004 | Kirovski et al. |
| 2004/0030934 A1 | 2/2004 | Mizoguchi et al. |
| 2004/0111648 A1* | 6/2004 | Fujisawa ........................ 713/202 |
| 2004/0172564 A1 | 9/2004 | Federova et al. |
| 2004/0230843 A1 | 11/2004 | Jansen |
| 2004/0250138 A1 | 12/2004 | Schneider |
| 2004/0260955 A1 | 12/2004 | Mantyla |
| 2005/0010758 A1 | 1/2005 | Landrock et al. |
| 2005/0010768 A1 | 1/2005 | Light et al. |
| 2005/0071637 A1 | 3/2005 | Shirakawa |
| 2005/0071686 A1 | 3/2005 | Bagga et al. |
| 2005/0076357 A1 | 4/2005 | Fenne |
| 2005/0169496 A1 | 8/2005 | Perry |
| 2005/0268100 A1 | 12/2005 | Gasparini et al. |
| 2005/0268101 A1 | 12/2005 | Gasparini et al. |
| 2005/0268107 A1 | 12/2005 | Harris et al. |
| 2005/0276442 A1 | 12/2005 | Alasia et al. |
| 2005/0283443 A1 | 12/2005 | Hardt |
| 2005/0283614 A1 | 12/2005 | Hardt |
| 2006/0020812 A1 | 1/2006 | Steinberg et al. |
| 2006/0020815 A1 | 1/2006 | Varghese et al. |
| 2006/0053293 A1 | 3/2006 | Zager et al. |
| 2006/0075027 A1 | 4/2006 | Zager et al. |
| 2006/0075028 A1 | 4/2006 | Zager et al. |
| 2006/0085360 A1 | 4/2006 | Grim, III et al. |
| 2006/0105739 A1 | 5/2006 | Frank et al. |
| 2006/0174339 A1 | 8/2006 | Tao |
| 2006/0183551 A1 | 8/2006 | Prudent |
| 2006/0206717 A1 | 9/2006 | Holt et al. |
| 2006/0206918 A1 | 9/2006 | McLean |
| 2006/0206919 A1 | 9/2006 | Montgomery et al. |
| 2006/0230435 A1 | 10/2006 | Kokumai |
| 2006/0248344 A1 | 11/2006 | Yang |
| 2007/0023506 A1 | 2/2007 | Lagadec et al. |
| 2007/0033102 A1 | 2/2007 | Frank et al. |
| 2007/0041621 A1 | 2/2007 | Lin et al. |
| 2007/0074119 A1 | 3/2007 | Komine et al. |
| 2007/0130618 A1 | 6/2007 | Chen |
| 2007/0198846 A1 | 8/2007 | Watari |
| 2007/0250920 A1 | 10/2007 | Lindsay |
| 2007/0277224 A1 | 11/2007 | Osborn et al. |
| 2008/0052245 A1 | 2/2008 | Love |
| 2008/0141351 A1 | 6/2008 | Park |
| 2008/0222710 A1 | 9/2008 | Blagsvedt et al. |
| 2008/0235788 A1 | 9/2008 | El Saddik et al. |
| 2008/0307310 A1 | 12/2008 | Segal et al. |
| 2008/0320310 A1 | 12/2008 | Florencio et al. |
| 2009/0037339 A1 | 2/2009 | Ancell et al. |
| 2009/0038006 A1 | 2/2009 | Traenkenschuh et al. |

FOREIGN PATENT DOCUMENTS

| | | |
|---|---|---|
| KR | 20020026636 A | 4/2002 |
| KR | 20040032869 A | 4/2002 |
| KR | 20040047155 A | 6/2004 |
| KR | 20040067123 A | 1/2006 |
| KR | 20060127850 A | 12/2006 |
| NZ | 541711 A | 7/2005 |
| WO | 02054199 A1 | 7/2002 |
| WO | 2006064241 A2 | 6/2006 |

OTHER PUBLICATIONS

A Remote User Authentication Scheme Using Strong Graphical Passwords by Ku et al; Publisher: IEEE; Year: 2005.*

Dhamija et al., Déjà vu: a user study using images for authentication. Proceedings of the 9th USENIX Security Symposium, Denver, CO, Aug. 14-17, 2000 (15 pages).

* cited by examiner

Username :
Password :

Fig. 4

GRAPHICAL IMAGE AUTHENTICATION AND SECURITY SYSTEM

CROSS REFERENCE TO RELATED APPLICATION

This application is a continuation of U.S. Ser. No. 11/420,061, filed May 24, 2006, the entire contents of which are incorporated herein by reference.

BACKGROUND OF THE INVENTION

1. Field of the Invention

The present invention is directed to a method and system of authenticating identity to a computer system. In particular, the present invention is directed to a graphical image identity authentication system.

2. Background

Computer networks, particularly those with global reach such as the Internet, have greatly influenced the way that individuals, companies and institutions conduct transactions, and store and retrieve documents, images, music, and video. Convenience, ease of use, speed, and low overhead costs are contributing factors to the widespread use of the Internet for purchasing goods as well as conducting confidential transactions. Entire industries have emerged as a result of the evolution of the Internet.

Secure access to computer systems and computer networks has been traditionally guarded with a username and password pair. This requires the user to protect the username and password from unauthorized use. If the username and password are not protected, accounts and files can be compromised. Unfortunately, a number of rogue individuals and organizations have emerged that are dedicated to fraudulently obtaining confidential information for unauthorized or criminal activities.

A pervasive tool used in obtaining confidential information is keystroke-logging software, which constitutes a program that monitors and records what users type on their computers. Such software often comprises the payload of viruses, worms, Trojan horses, and other forms of malware. Keystroke-logging software can reveal what a user is typing o a computer without the user's knowledge of this event occurring.

Companies and institutions routinely use keystroke-logging software to monitor employee activity. Also, families may use these types of programs to monitor children's online activities. The widespread availability of this type of software, however, has lead to unauthorized or criminal use, resulting in the alarming rate of identity theft seen throughout the world.

Prime targets for these attacks are financial institutions, as more and more consumers and businesses use electronic methods for purchasing and making payments. According to the American Banker's Association, cash and checks now account for only 45 percent of consumer's monthly payments, down from 57 percent in 2001, and 49 percent in 2003. The trend is clearly in favor of electronic transactions, providing a wider field for identity theft.

Login information may also be "heard" by sophisticated analysis of the distinct sounds made by different keys. An inexpensive microphone near a keyboard can reveal most of what is being typed with a surprising degree of accuracy (http://www.schneier.com/blog/archives/2005/09/snooping_on_tex.html). The present invention thwarts attempts to record the successful completion to the login process, as the keystrokes typed cannot be linked to the user's true authentication parameters.

Login information is also vulnerable to simple spying or "shoulder-surfing", as a person with malicious intent watches an unsuspecting user sign into his or her account. The present invention employs a method that significantly reduces the likelihood of a successful shoulder-surfing style of attack.

Additional security mechanisms are necessary in addition to the username/password paradigm to provide stronger identity authentication. There have been various other attempts do so.

Enterprises and institutions are using costly physical devices to identify legitimate customers and users. The existing devices generate a unique pass code for each user every 30 to 60 seconds. If an attacker manages to intercept a user ID and password, the information cannot be used to access the site without an additional authentication identifier displayed by the device. The devices significantly reduce instances of identity or information theft, but present challenges for both the institutions and individual users.

The enterprise may meet with consumer resistance in implementing use of the physical device. If the user does not have the device, he or she cannot gain access to the site. Besides the tremendous initial cost of purchasing the physical devices and implementing the new system, if the device is lost, stolen, or damaged, the enterprise will incur even more significant costs. In the context of business use of the device, the company incurs the cost of lost productivity from a worker who cannot access company information, as well as the cost of replacing the actual device. In the context of consumer use, if the consumer cannot access his or her accounts because of a lost device, the direct costs and more significantly the indirect costs incurred by the enterprise to assist the consumer in gaining access far outweighs the advantages of using the device system.

In U.S. Pat. No. 5,559,961. Blonder provides a solution for utilizing graphical passwords. The framework described displays a static image in which the user touches predetermined areas of the screen, called "tap regions," in a particular sequence. As the user taps various areas on the display, the regions tapped are successively removed from the screen. These regions of the screen, and the order of the sequence they are tapped, are chosen by the user during an initial enrollment phase. The sequence and regions of taps is stored in the system as the user's password. One shortcoming of this solution is the likelihood of a shoulder-surfing attack: once an attacker views a user entering the sequence by touching areas of the screen, he or she is then easily able to replicate the sequence to successfully gain access to the user's account.

U.S. Patent Application Publication No. 2003/0191947 to Stubblefield uses inkblots as images for authentication of a user's identity when logging into computer systems. The authentication method described in this patent provides for a display of a random sequence of inkblots that the user has identified when he or she enrolled his or her login information. One drawback to this process stems from the identification of the inkblot. Although the user is required to identify and verify the alphanumeric text associated with the inkblots in the enrollment process, the ineffable nature of inkblots will cause consumers problems in remembering the code for their inkblot selections. A frustrated user will simply save their password information on their computer, write the information down, or enter incorrect password information, which defeats the security offered by this system. Also, this process is very intimidating for users, especially those who are neophyte users, because the inkblot is easily misconstrued as a myriad of different objects. The inkblot is just that: a blot on a screen the user will associate with a real world object. If that user misinterprets or forgets the association they have made with the inkblot they are denied access to their system. More importantly, the sequence process significantly increases login time for users. Currently, users are demanding more secure login techniques, but they desire to maintain the same level of convenience that they currently enjoy with the username/password login process. This authentication technique does not provide the ease of use that consumers desire.

U.S. Patent Application Publication No. 2004/0230843 to Jansen, which is a login authentication process using a sequence of images selected by the user, illustrates the potential of image-based authentication in protecting users from identity theft. The authentication method described in this patent application begins with the user selecting an image theme, such as animals, and then selecting a sequence of images within the image theme that becomes the password (e.g. if the category chosen is animals, one possible sequence is horse, cat, dog, cat, cat, horse). The success of the login process is predicated on the user's ability to replicate the sequence of images he or she has chosen within the image theme. In other words, the user must memorize the proper sequence. One drawback appears to be the complex nature of the sequence process. As defined in the patent application, if a user feels that he or she will be unable to remember the password, the user will simply write down the password so that recall becomes unnecessary. Also, because the images are typically static (the user can elect to "shuffle" images between login attempts, but most will likely stay with the simple default configuration), software can be created to automate the process. In this scenario the authentication requires no human interaction to complete the login, which tremendously decreases the level of security provided. Although the positions of the images can be shuffled within the grid, the fact that they are static means that shuffling only prevents attackers from guessing the likely placement of the sequence, not the images themselves. Moreover, the traditional text password is completely removed from the login process, meaning that the security offered in this solution is only single layer, whereas authentication processes that complement the existing login process provide multiple levels of security.

U.S. Patent Application Publication No. 2005/0268100 and Publication No. 2005/0268101 to Gasparini et al, discloses two way authentication including images which serve as customization information so that an entity can authenticate itself to a user, but is otherwise dissimilar.

Because of these noted shortcomings, an improved system and method is needed to create password values that are both exceedingly difficult for an intruder to compromise, while simultaneously easy for a user to apply and maintain.

SUMMARY OF THE INVENTION

The present invention provides a system and method for the secure identity authentication to a computer system. It is a further object and purpose of the present invention to provide an authentication and security system, which requires graphical discernment of one or more image categories from a grid of distinct visual images.

The present invention provides an enrollment mechanism for new users. During enrollment, the user will be required to select a series of one or more image categories, which will serve as the user's authentication sequence.

The present invention requires the user to input a username at the point of user login. After validating the username, a grid of images corresponding to the pre-defined categories will be displayed. One image from each category will appear at a random location within the grid. If the number of available categories exceeds the number of image positions in the grid, (he displayed categories may be selected from the pool of available categories.

The present invention overlays each image with a randomly generated sequence of one or more characters. This sequence is known as an "image key" or "image identifier". Within the image grid, the user will identify the images corresponding to the pre-selected authentication sequence, and input each associated image identifier in the provided input field.

The present invention will authenticate the identity of the user by matching the image identifier(s) input by the user with the correct image identifiers(s) derived from the pre-chosen authentication sequence.

The present invention is immune from attacks using keystroke loggers. The image identifier for each image is a randomly generated sequence of one or more characters. The mapping between the image identifier and the image category is established by the authentication mechanism. The user ascertains that mapping by graphical discernment of the images. The authentication sequence of the user is input by the user using the randomly generated image identifier. Without the images displayed, the text entered by the user will be effectively random characters and will not provide clues to the authentication sequence of the user. Attackers will not be able to ascertain the image category authentication sequence of a user by capturing keystrokes.

The present invention mitigates the risk of attacks involving shoulder surfing. Traditional username/password authentication systems could be compromised if attackers visually discern the keystrokes entered by the user during the login process. The present invention requires the attacker to visually discern both the keystroke entered by the user in the form of image identifier as well as the graphical discernment of the images for the mapping between image identifier and the image category. The authentication sequence of the user is compromised only if both forms of information are captured. This increases the difficulty in successfully executing the attack.

In terms of brute force attacks, the search space for the present invention is equal to:

$$(g)^n$$

Where g is the number of elements in the image grid and n is the length of the authentication sequence. A reasonable implementation might call for a grid size of 16 and an authentication sequence length of 3. This would result in a brute force search space of:

$$16^3 = 4096$$

On average, the brute force attack would succeed after 2048 tries. While this seems like a low number in the context of security algorithms risk is mitigated by the nature of the algorithm as well as by additional safeguards. The mapping between the image identifier and the image category requires graphical discernment of images. Image identifiers could be obfuscated on the image using captcha techniques, making them discernable only by humans. This means the brute force attack must be perpetrated by a human and cannot be automated. An automated agent could only randomly guess the image identifier. The search space for this brute force attack is $$(r^l)^n$$

Where l is the length of the image identifier, r is the range of the image identifier (26 if it is case insensitive alphabetical, 96 if it is displayable characters), and n is the length of the authentication sequence. A reasonable policy could call for an alphabetical image identifier of length 2. In this case, the brute force search space is:

$$(26^2)^3 = 308,915,776$$

If the captcha obfuscation could be defeated, it is still effectively impossible with the current state of the art for automated processes to recognize the image category from a random image (i.e. recognize a random image of a Ford Mustang® as an automobile). Therefore, automated agents would not be able to perform a systematic brute force attack. They would have to enter random image identifier at each try. This attack would succeed on average after 4096 tries.

The threat from brute force attacks could be further mitigated by implementing a timed lockout policy after unsuccessful logins. A reasonable policy would he to temporarily disable the account for 10 minutes after three unsuccessful logins in a row. On average. the time it would take to succeed with a brute force attack would be:

$$(10 \text{ minutes}) * (4096-3) = 40930 \text{ minutes} = 28 \text{ days}$$

Furthermore, the size of the image grid, the length of the authentication sequence, and the lock out time could be increased to exponentially increase the brute force search time.

Ideally, the present invention should be used in conjunction with a traditional identity authentication paradigm such as username/password as an extra layer of security, thereby increasing the security provided by the overall system.

The present invention is also designed to facilitate advertisement by displaying images, descriptions, and/or references supplied or chosen by advertisers.

The present invention may be extended by replacing the images in the image grid with audio, video, or other forms of media or multimedia.

The present invention has a number of embodiments or models within its scope as set forth in detail herein.

BRIEF DESCRIPTION OF THE DRAWINGS

FIGS. 4 and 5 illustrate examples of screen displays that would be incorporated as a part of the present invention as shown in FIG. 2 or 3.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention provides a method and system for user identity authentication to a computer system which requires users to select an authentication sequence based on categories during enrollment and recreating the authentication sequence during login by graphically discerning images belonging to the previously selected categories.

Figure 1:
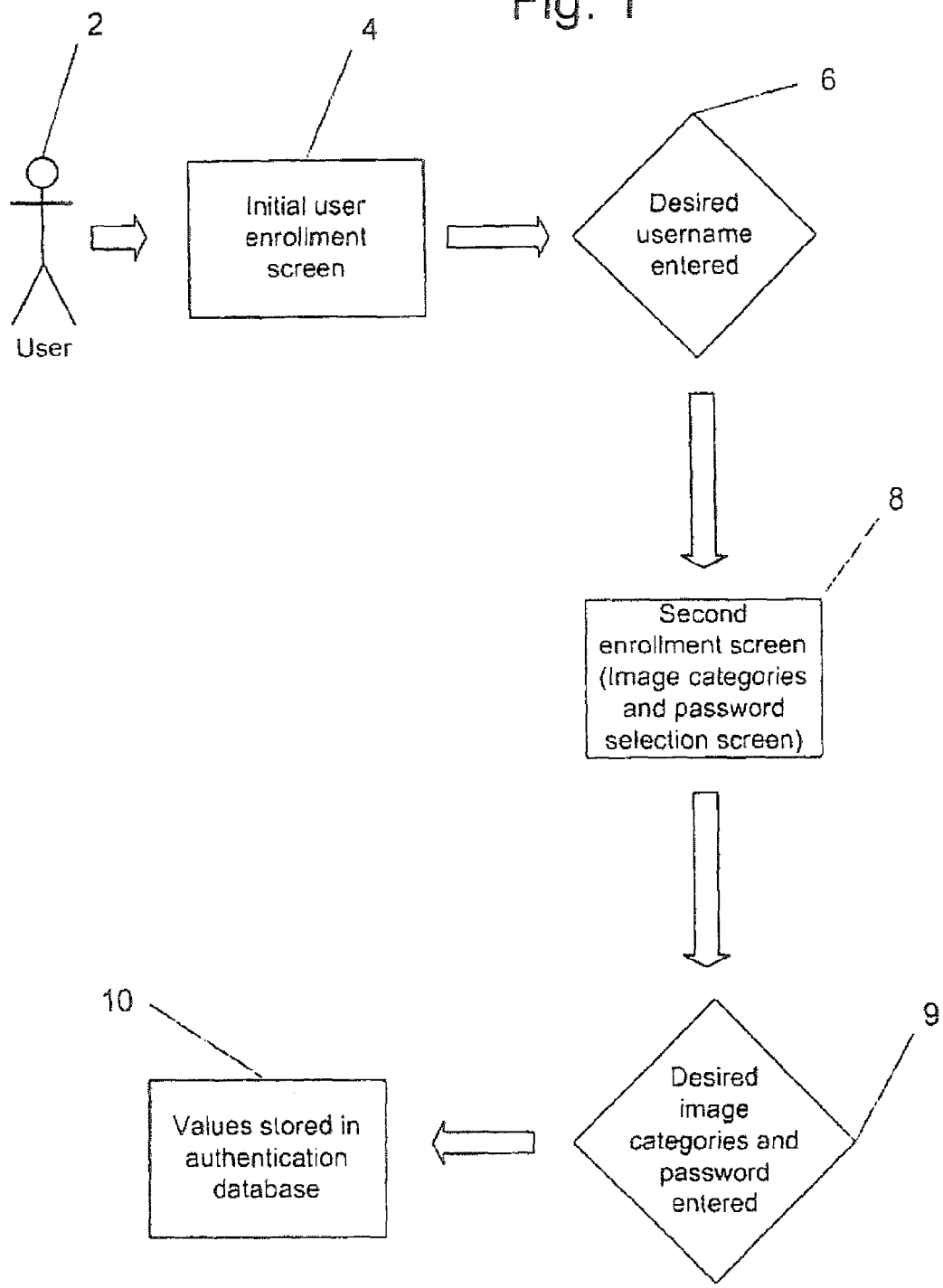
FIG. 1 illustrates a simplified flowchart diagram of an enrollment process used in connection with the present invention directed to a graphical image authentication and security system.

Referring to the drawings in detail, FIG. 1 illustrates a simplified flow chart diagram of an initial enrollment process in order to enroll a user to utilize the present invention. During enrollment, the user shown as 2 will be presented with initial enrollment screen in box 4 where the desired username is entered in diamond 6. After the username is granted a second enrollment screen in box 8 is presented to select the traditional password and the image category authentication sequence for the system. The authentication information is entered in diamond 9 and stored into the authentication database in box 10.

Figure 2:
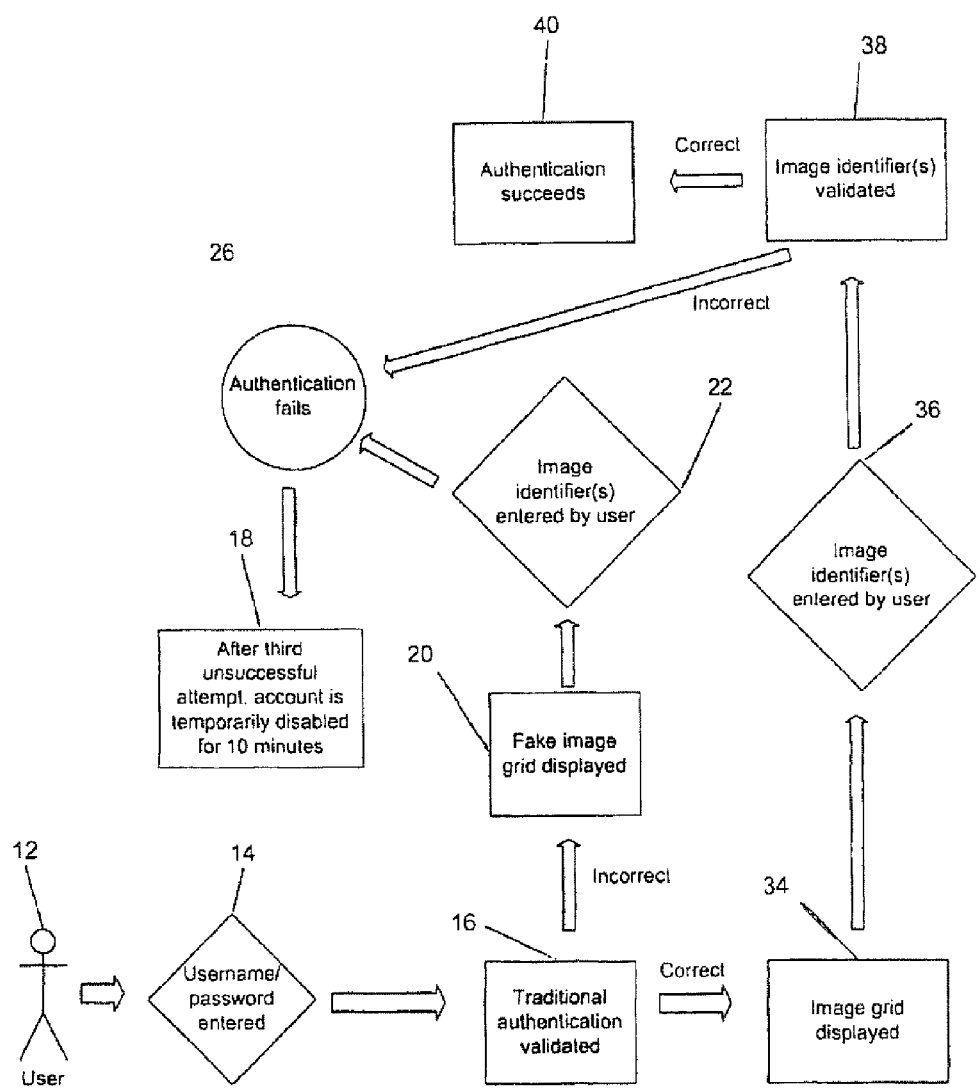
FIG. 2 illustrates a simplified flowchart diagram of a preferred embodiment in accordance with the present invention directed to a graphical image authentication and security system.

Referring to the drawings in detail, FIG. 2 illustrates a simplified flowchart diagram of a preferred embodiment of the present invention. In this embodiment, the Graphical Image Authentication and Security System is used in conjunction with a traditional username/password authentication paradigm to increase the overall level of security in a system. The overall process includes a number of discreet steps to authenticate identity to a computer system. By way of example, but not limitation, the computer device operated by the user may include a personal computer having a central processing unit, a keyboard or other input device and monitor; a personal digital assistant: a user terminal at a bank automated teller machine (ATM); a cellular mobile telephone; or other device.

Figure 4:
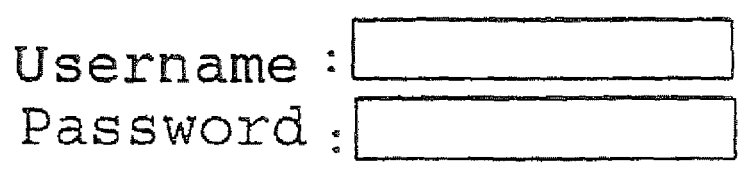

The user 12 will enter a first login account identifier, such as his or her username, and a traditional password, represented by diamond 14 in an input device such as a keyboard. By way of example, the user name may be a series of alphanumeric characters, as is well known. By way of example, the password maybe a series of alphanumeric and special characters, as is well known. FIG. 4 shows an example of the traditional username/password login screen.

The username/password is validated in box 16. If the authentication fails because of the username/password entered, a fake grid of images that appear normal is displayed as shown at box 20, the user will be able to enter image identifier normally at diamond 22, however any authentication attempt fails as shown at reference numeral 26.

Figure 5:
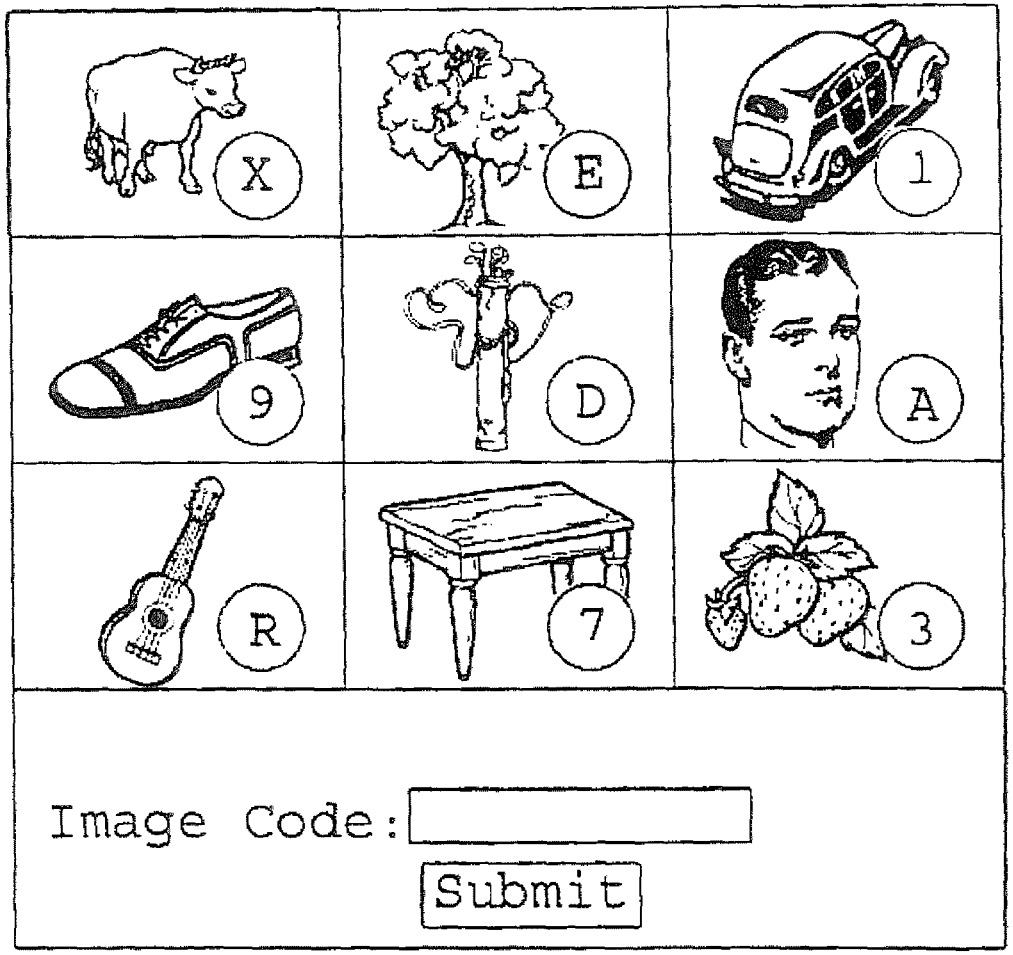

If the username/password pair is authenticated, an image grid will be generated and displayed at box 34. As shown on FIG. 5, the cells of the grid will display images from different categories. The location of the categories in the grid is randomized. The specific image for each category is chosen randomly from a database of images for that specific category. Each image will be overlaid with a unique randomly generated image key. Captcha techniques could be employed to obfuscate the image key so that it is not machine-readable. This would require a human to mediate the login and prevent automated brute force attacks on the authentication process.

The user will select the image on the grid according to the categories in their authentication sequence by entering the image key overlaid on the images, box 36. The sequence of image keys is sent to the authentication server for validation, box 38. If the image keys are validated, the authentication concludes successfully represented by box 40. If the image keys are not validated, authentication fails and the login process must be reinitiated. A timed lockout of 10 minutes as shown by 18 is applied after three unsuccessful logins to mediate the threat from brute force guessing for the authentication sequence.

Figure 3:
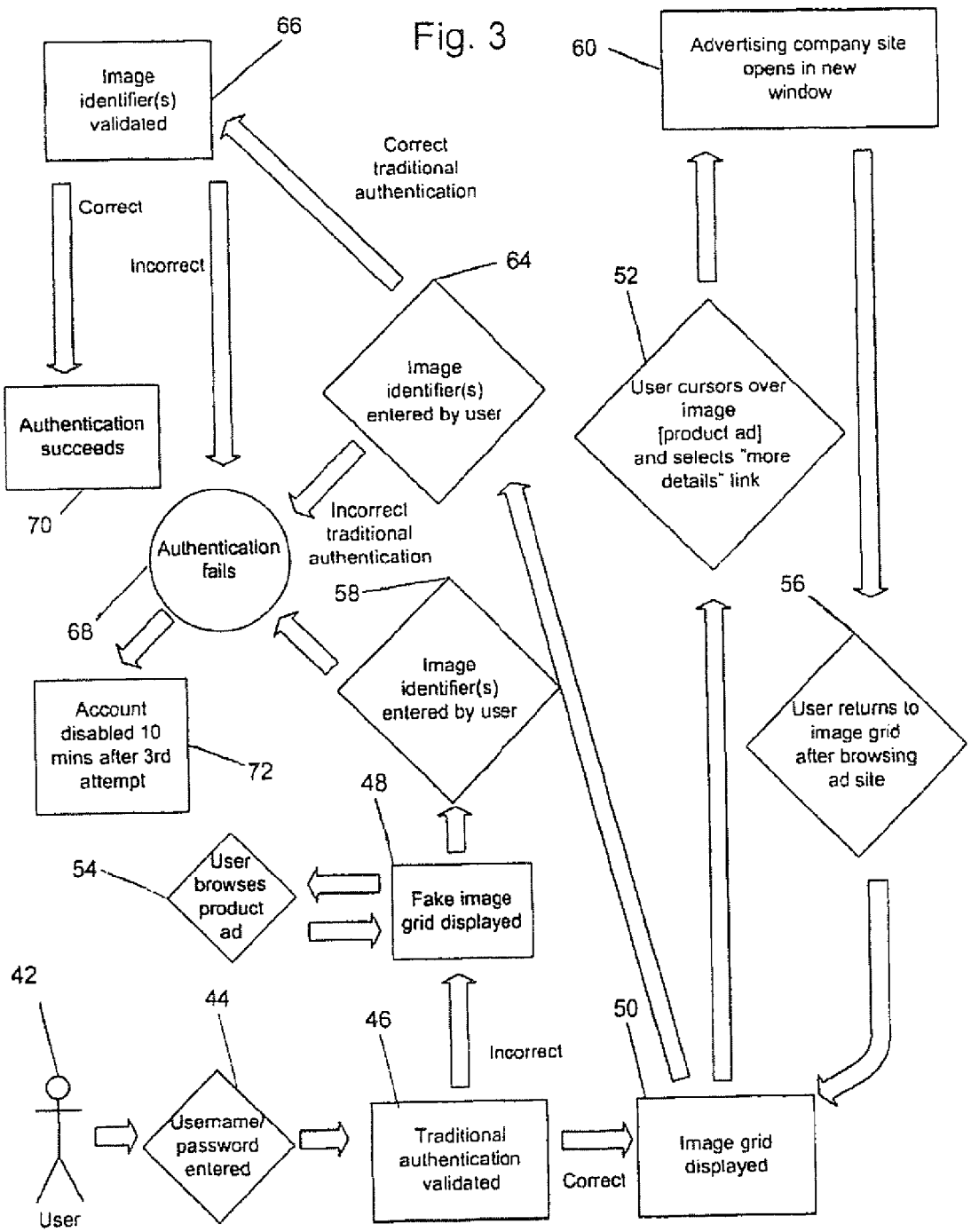
FIG. 3 illustrates a simplified flowchart diagram of an alternate embodiment of the present invention.

FIG. 3 illustrates an alternate embodiment of the present invention that extends the preferred embodiment from FIG. 2 to incorporate advertisements. The enrollment process for this embodiment will be identical to that of the previously described embodiment illustrated in FIG. 1. The login process is also similar to that of FIG. 2.

The user 42 will enter a first login account identifier, such as his or her username, and a traditional password, represented by diamond 44 in an input device such as a keyboard. By way of example, the user name may be a series of alphanumeric characters, as is well known. By way of example, the password maybe a series of alphanumeric and special characters, as is well known. FIG. 3 shows an example of the traditional username/password login screen.

The username/password is validated in box 46. If the authentication fails because of the username/password entered, a fake grid of images that appear normal is displayed as shown at box 48, the user will be able to enter image identifier normally at diamond 58, however any authentication attempt fails as shown at reference numeral 68.

If the username/password pair is authenticated, an image grid will be generated and displayed at box 50. As shown on FIG. 5, the cells of the grid will display image from different categories. The location of the categories in the grid is randomized. The specific image for each category is chosen from a database of images for that specific category. Each image will be overlaid with a unique randomly generated image key. Captcha techniques could be employed to obfuscate the image key so that it is not machine-readable. This would require a human to mediate the login and prevent automated brute force attacks on the authentication process.

An ancillary benefit of the present invention stems from the requirement of the user to view each of the visual images to determine which image is in the user's category. Advertising opportunities are presented for advertisers to display products in the array of images. The user cannot ignore the advertising, since the user must view and discern each of the images in order to choose the image category.

The images in the database for this embodiment will contain advertisement images provided by advertisers. The image selected to be displayed on the grid will be based on the websites, the advertisement campaigns, and other parameters. The image grid displayed in box 48 and 50 will behave identically. The diamond in 54 is abbreviated and embodies 52, 60, and 56. When the user places the cursor over the image as in 52, additional information and links about the advertisement will be provided. If the user chooses to follow an advertisement link, the destination of the link will open in a new window as shown in 60. When the user finishes browsing the advertisement website, the user will return to the log in screen through diamond 58. The user would not need to reenter the username and password after viewing an advertisement link. When the user finishes viewing the advertisement link, the image grid is refreshed and displayed again in 48 and 50 respectively.

In the case where the username/password is validated at 50, the user will select the image on the grid according to the categories in their authentication sequence by entering the image key overlaid on the images, box 64. The sequence of image keys is sent to the authentication server for validation, box 66. If the image keys are validated, the authentication concludes successfully represented by box 70. If the image keys are not validated, authentication fails at 68 and the login process is reinitiated. A timed lockout of 10 minutes is applied after three unsuccessful logins to mediate the threat from brute force guessing for the authentication sequence as in 72.

Whereas the present invention has been described in relation to the drawings attached hereto, it should be understood that other and further modifications, apart from those shown or suggested herein, may be made within the spirit and scope of this invention.

The invention claimed is:

1. A method for authenticating identity to a computer system, which method comprises:
   receiving a first login account identifier from a user in communication with said computer system;
   determining if said user is recognized and enrolled from said first login account identifier;
   generating and displaying a randomly generated grid of images, wherein at least one of said images include a link to products or services sponsored by advertisers;
   wherein the grid of images comprises at least one image selected from an authenticating image category, wherein the authenticating image category comprises a plurality of unique images, wherein the authenticating image category is pre-selected by the user, wherein the pre-selection occurs during enrollment, wherein the pre-selection allows the user to memorize the authenticating image category;
   receiving at least one image identifier from said user; and
   authenticating identity to said computer system upon validation of said at least one image identifier.

2. A method for authenticating identity to a computer system as set forth in claim 1 wherein said first login account identifier is a username.

3. A method for authenticating identity to a computer system as set forth in claim 1 wherein said at least one image identifier is generated by the user according to one or more authenticating image categories pre-selected by said user during the enrollment process.

4. A method for authenticating identity to a computer system as set forth in claim 1 wherein said image is randomly generated.

5. A method for authenticating identity to a computer system as set forth in claim 1 wherein the positions of said authenticating image categories within said grid are randomly determined.

6. A method for authenticating identity to a computer system as set forth in claim 1 wherein the size of said grid is variable.

7. A method for authenticating identity to a computer system as set forth in claim 1 wherein the images include animated images, videos, or other multimedia.

8. A method for authenticating identity to a computer system as set forth in claim 1 further comprising receiving a second account identifier from said user in communication with said computer system.

9. A method for authenticating identity to a computer system as set forth in claim 8 wherein said second account identifier is a password.

10. A method for authenticating identity to a computer system as set forth in claim 1 wherein said at least one image identifier requires multiple image identifiers.

11. A computer implemented authentication method comprising:
   pre-selecting at least one authenticating image category, the authenticating image category comprising a plurality of unique images;
   pre-selecting an account identifier for authentication;

displaying a grid of randomly selected images, each image having a randomly selected unique image identifier associated therewith, wherein at least one of the randomly selected images comprises a link to an advertisement;

wherein at least one of the images displayed on the grid is selected from the at least one authenticating image category, wherein the authenticating image category is pre-selected by the user, wherein the pre-selection occurs during enrollment, wherein the pre-selection allows the user to memorize the authenticating image category;

receiving at least one unique image identifier associated with at least one of the images displayed on the grid; and verifying the received unique image identifier corresponds to the at least one pre-selected authenticating image category associated with the account identifier.

12. The computer implemented authentication method of claim 11 further comprising pre-selecting an authentication parameter corresponding to the account identifier.

13. The computer implemented authentication method of claim 12 further comprising receiving the authentication parameter and verifying the authentication parameter corresponds to the account identifier.

14. The computer implemented authentication method of claim 11 wherein the grid of randomly selected images comprises at least four images.

15. The computer implemented authentication method of claim 11 wherein the at least one unique image identifier comprises at least one alphanumeric character.

16. A method for verifying a claimed identity of at least one user of a computer system, the method comprising: verifying a received unique image identifier corresponds with a pre-selected authenticating image category, wherein the pre-selected authenticating image category and an account identifier are previously selected by the at least one user and stored in the computer system and wherein the authenticating image category comprises a plurality of unique images; wherein at least one of the unique images comprises a link to an advertisement, and permitting access to the computer system when there is a match between the received unique image identifier corresponding to the image from the pre-selected authenticating image category to the account identifier, wherein the authenticating image category is pre-selected by the user, wherein the pre-selection occurs during enrollment, wherein the pre-selection allows the user to memorize the authenticating image category.

17. A method for verifying identity of a plurality of users of a computer system, the method comprising:

each user pre-selecting an account identifier and at least one authenticating image category wherein the authenticating image category comprises a plurality of unique images, wherein at least one of the unique images comprises a link to an advertisement;

generating a grid of randomly selected images when a user attempts to access the computer system, wherein at least one of the randomly selected images is from the at least one pre-selected authenticating image category and wherein each image corresponds to a unique randomly assigned image identifier, wherein the authenticating image category is pre-selected by the user, wherein the pre-selection occurs during enrollment, wherein the pre-selection allows the user to memorize the authenticating image category;

receiving an input comprising at least one of the unique image identifiers, wherein the user input is selected from the group consisting of alphanumeric characters, clicks, touches, and gestures;

comparing the at least one image category associated with the received at least one unique image identifier with the account identifier of the user attempting to access the computer system; and permitting the user to access the computer system when there is a match between the at least one image category associated with the at least one received unique image identifier and the at least one authenticating image category pre-selected by the user.

18. The method of claim 17 further comprising allowing at least one of the plurality of users to pre-select an authentication parameter corresponding to its account identifier, wherein the received input from the at least one of the plurality of users further comprises the authentication parameter, the method comprising:

permitting the user to access the computer system when there is a match between the at least one authenticating image category associated with the at least one received unique image identifier, the authenticating image category pre-selected by the user, and between the received authentication parameter and the authentication parameter pre-selected by the user.

19. The method of claim 18 wherein the authentication parameter comprises a password.

20. The method of claim 17 wherein a first user pre-selects a plurality of authenticating image categories in a predetermined sequence and wherein the received input comprises a plurality of unique image identifiers, the method further comprising:

permitting the first user to access the computer system when there is a match between the sequence of authenticating image categories associated with the sequence of received unique image identifiers and the sequence of authenticating image categories pre-selected by the user.

21. The method of claim 20 wherein a second user pre-selects an authentication parameter corresponding to its account identifier, wherein the received input from the second user further comprises the authentication parameter, the method comprising:

permitting the second user to access the computer system when there is a match between the at least one authenticating image category associated with the at least one received unique image identifier, the image category pre-selected by the second user, and between the received authentication parameter and the authentication parameter pre-selected by the second user.

22. The method of claim 20 wherein a second user pre-selects a plurality of authenticating image categories in a predetermined sequence and length different from the predetermined plurality of pre-selected authenticating image categories of the first user.

23. The method of claim 11 wherein the authenticating image category is chosen from the group of animals and automobiles.

* * * * *